United States Patent [19]

Nagata et al.

[11] Patent Number: 4,828,945
[45] Date of Patent: May 9, 1989

[54] SOLID ELECTROLYTE SHEET AND PROCESS FOR PRODUCING THE SAME

[75] Inventors: Masaki Nagata; Naoshi Yasuda, both of Yokohama; Shigeo Kondo, Hirakata; Tadashi Sotomura, Kashiwara, all of Japan

[73] Assignees: Japan Synthetic Rubber Co., Ltd., Tokyo; Matsushita Electric Industrial Co., Ltd., Osaka, both of Japan

[21] Appl. No.: 172,165

[22] Filed: Mar. 23, 1988

[30] Foreign Application Priority Data

| Mar. 27, 1987 [JP] | Japan | 62-73727 |
| Mar. 27, 1987 [JP] | Japan | 62-73729 |
| Nov. 6, 1987 [JP] | Japan | 62-280578 |

[51] Int. Cl.$^4$ .............................................. H01M 6/18
[52] U.S. Cl. .................................................... 429/191
[58] Field of Search ................ 429/191, 193, 30, 33

[56] References Cited

U.S. PATENT DOCUMENTS

| 3,837,920 | 9/1974 | Liang et al. | 429/191 |
| 4,060,667 | 11/1977 | Askew et al. | 429/191 X |
| 4,060,672 | 11/1977 | Von Alpen et al. | 429/191 |
| 4,237,201 | 12/1980 | Rouxel et al. | 429/191 X |
| 4,298,664 | 11/1981 | Joshi et al. | 429/191 |

Primary Examiner—Anthony Skapars
Attorney, Agent, or Firm—Spencer & Frank

[57] ABSTRACT

A solid electrolyte sheet comprising an ion-conductive inorganic solid electrolyte and an insulating elastomer, wherein the inorganic solid electrolyte powder is uniformly dispersed in the insulating elastomer in a volume fraction of 55-95% and which sheet has a hardness (ASTM A) of 65-96 and a thickness of 10-250 μm, or a solid electrolyte sheet comprising a non-conductive reticulate material and a mixture of an ion-conductive inorganic solid electrolyte powder and an insulating elastomer, in which mixture the solid electrolyte powder is uniformly dispersed in the insulating elastomer in a volume fraction of 55-95%, at least the openings of the reticulate material being filled with said mixture. Said solid electrolyte sheets are superior in ion-conductivity, processability, productivity, storage stability and flexibility and are suitable for use in thin and large electrochemical elements.

12 Claims, 2 Drawing Sheets

SOLID ELECTROLYTE SHEET AND PROCESS FOR PRODUCING THE SAME

This invention relates to a solid electrolyte sheet and a process for producing the sheet. More particularly, this invention relates to a solid electrolyte sheet having an excellent ion-conductivity for use in solid electrochemical elements such as solid microcell and the like, as well as to a process for producing the sheet.

The technical progress in electronic industry in recent years is remarkable and electronic components such as IC, LSI and the like are much used in almost all fields. Such a technical progress is also seen in the field of cell technique and an attempt has been made to make cells smaller and thinner. Such cells are in use in large amounts as a power source of card-shaped portable calculator, camera, wrist watch, etc.

Most of the cells used in the above applications are alkali cells or lithium cells, and a liquid electrolyte is used therein. These cells using a liquid electrolyte requires a high degree of sealing technique, and there is currently employed a sealing technique in which crimp seal via a gasket is used. In this sealing technique, however, the thinner the cells, the larger the proportion of a sealing material occupying the cell volume, which makes it difficult to provide a required cell capacity. Therefore, there is a limitation in making cells thinner.

Recently, cells using a lithium-based solid electrolyte are also available commercially. Active metallic lithium is, however, used as an active substance for negative electrode, and hence, a sealing technique of higher reliability is required than that required by a liquid electrolyte cell, and it is now difficult to make the cells thinner.

Under the above-mentioned situations, it is tried to develop new electrolytes in order to make cells smaller and thinner. One instance is the application of a polyelectrolyte to cell, etc. in which its excellency in processability, flexibility, etc. are utilyzed sufficiently. A typical example of the polyelectrolyte is a poly(oligooxyethylene methacrylate)-alkali metal salt system. However, this polyelectrolyte has not reached practical application as yet because of the following disadvantages: The ion-conductivity of the polyelectrolyte is at best about $10^{-5}$ s/cm at room temperature, the selectivity of movable ion thereof is inferior and it causes the movement of not only cation (e.g. $L^+$) but also anion (e.g. $ClO_4^-$).

There has been an attempt to utilize ion-conductive solid electrolyte having a large ion-conductivity such as silver ion-conductivity or copper ion-conductivity. Typical examples of these ion-conductive solid electrolytes include $RbAg_4I_5$ as a silver ion-conductive solid electrolyte, $RbCu_4I_{1.5}Cl_{3.5}$ as a copper ion-conductive solid electrolyte, $0.4LiSiO_4-0.6Li_3VO_4$ as a lithium ion-conductive solid electrolyte and $H_3Mo_{12}PO_{40}\cdot29H_2O$ and $H_3W_{12}PO_{40}\cdot29H_2O$ as a proton-conductive solid electrolyte.

These solid electrolytes are in the form of inorganic solid powder, and hence, pelletization by high pressure press is required when processed into a cell, etc. This is a great obstacle for achieving high productivity, uniformity, etc. Further, the pellets obtained are hard and brittle and there is a limitation for making cells thinner and it is difficult to produce a cell of a large surface area. Furthermore, when these solid electrolytes are applied to a cell, etc., it is necessary to apply a great pressure to between the electrolyte and an electrode when adhering the electrolyte to an electrode active material. Therefore, there is a problem of workability, adhesion, etc. being not constant and uniform adhesion is not obtained in the case of adhering a large area. In addition, destruction of electrolyte is caused.

An object of this invention is to solve the above-mentioned problems of the prior art and provide a solid electrolyte sheet of an excellent ion-conductivity which is superior in processability, productivity, storage stability, flexibility and adhesion to electrode active substances and which can be made thinner and larger in surface area.

Another object of this invention is to provide a process for producing the solid electrolyte sheet.

According to this invention, there is provided a solid electrolyte sheet comprising an ion-conductive inorganic solid electrolyte powder (hereinafter referred to as "the solid electrolyte powder") and an insulating elastomer, wherein the solid electrolyte powder is uniformly dispersed in the insulating elastomer in a volume fraction of 55–95% and which sheet has a hardness (ASTM A) of 65–96 and a thickness of 10–250 $\mu$m (said solid electrolyte sheet is hereinafter referred to as "the solid electrolyte sheet I").

This invention further provides a solid electrolyte sheet comprising a non-conductive reticulate material and a mixture of an ion-conductive inorganic solid electrolyte powder and an insulating elastomer, in which mixture the inorganic solid electrolyte powder is uniformly dispersed in the insulating elastomer in a volume fraction of 55–95%, at least the openings of the reticulate material being filled with said mixture (said solid electrolyte sheet is hereinafter as "solid electrolyte sheet II").

The solid electrolyte powder used in this invention is, for example, powder of $K_yRb_{1-y}Cu_4I_{2-x}Cl_{3+x}$ (y is any number between 0 and 0.5 and x is any number between 0.2 and 0.6), $MAg_4I_5$ (M is Rb or K), $0.4LiSiO_4\cdot0.6Li_3VO_4$, $H_3Mo_{12}PO_{40}\cdot29H_2O$ or $H_3W_{12}PO_{40}\cdot29H_2O$. Among them, preferred are copper ion-conductive and silver ion-conductive solid electrolytes such as $K_yRb_{1-y}Cu_4I_{2-x}Cl_{3+x}$ (Y is any number between 0 and 0.5 and x is any number between 0.2 and 0.6) and $MAg_4I_5$ (M is Rb or K), in view of their excellency in ion-conductivity. $RbCu_4I_{2-x}Cl_{3+x}$ (x is any number between 0.2 and 0.6) is more preferable and $RbCu_4I_{1.5}Cl_{3.5}$ and $RbCu_4I_{1.75}Cl_{3.25}$ are most preferable. $RbCu_4I_{2-x}Cl_{3+x}$ is produced, for example, as follows: CuCl and CuI are recrystallized from hydrochloric acid and the resulting crystals are vacuum-dried at room temperature in a desiccator containing a desiccant such as $P_2O_5$ or the like. Separately, RbCl is vacuum-dried at 100° C. These three salts are mixed in a predetermined proportion and then dehydrated completely by heating them at 130° C. for 17 hours, after which the mixture is vacuum-sealed in a glass tube and melted. The resulting melt is slowly cooled to room temperature, and then the solid thus obtained is thoroughly ground with a ball mill or the like using an organic solvent such as toluene or the like as a dispersing agent. The resulting powder is pressure-molded and then heat-treated in an inert gas such as $N_2$ or the like, for example, at 130° C. for about 17 hours. The thus obtained pressure molded product is again ground with a ball mill or the like to obtain a powder of $RbCu_4I_{2-x}Cl_{3+x}$.

The shape and particle size of the solid electrolyte powder used in this invention are not critical. However, in view of, for example, miscibility with the insulating elastomer, the solid electrolyte powder preferably has such a particle size that the powder particles pass through a 100-200-mesh (Tyler) screen.

The insulating elastomer used in this invention is, for example, 1,4-polybutadiene, natural rubber, polyisoprene, styrene-butadiene rubber (SBR), acrylonitrile-butadiene rubber (NBR), ethylene-propylene-diene terpolymer (EPDM), ethylene-propylene copolymer (EPM), urethane rubber, polyester rubber, chloroprene rubber, epichlorohydrin rubber, silicon rubber, styrene-butadiene-styrene block copolymer (hereinafter referred to as "SBS"), styrene-isoprene-styrene block copolymer (hereinafter referred to as "SIS"), styrene-ethylene-butylene-styrene copolymer (hereinafter referred to as "SEBS"), styrene-ethylene-propylene block copolymer (hereinafter referred to as "SEP"), butyl rubber, phosphazene rubber, polyethylene, polypropylene, poly(ethylene oxide), poly(propylene oxide), polystyrene, poly(vinyl chloride), ethylene-vinyl acetate copolymer, 1,2-polybutadiene, epoxy resin, phenolic resin, cyclized polybutadiene, cyclized polyisoprene, poly(methyl methacrylate) and mixtures thereof. In this invention, in order to allow the solid electrolyte sheets I and II to have better decomposition voltage and better electron transport number, it is preferable that the insulating elastomer comprises at least 50% (by volume) of a thermoplastic high polymeric elastomer having no unsaturation such as SEBS, SEP, polyethylene, polypropylene, poly(ethylene oxide), polystyrene, poly(vinyl chloride), ethylene-vinyl acetate copolymer and mixtures thereof. Among these elastomers having no unsaturation, SEBS and SEP are particularly preferred in view of solubility in solvents, miscibility with solid electrolyte powder, adhesion to electrode active substances and the strengths of the solid electrolyte sheets I and II produced. Specific examples of SEBS include Kratons G-1650, G-1652, G-1657X, G-1660X and G-1726 (these are products of Shell). Specific examples of SEP include Kratons G-1701X and G-1702X (these are also products of Shell). It is more preferable that the insulating elastomer has an ASTM A hardness of not more than 90 in view of the flexibility required for the solid electrolyte sheets I and II of this invention and furthermore is moldable at a temperature of not more than 150° C. in view of the heat resistance of the solid electrolyte powder.

In the solid electrolyte sheets I and II of this invention, the volume fraction of the solid electrolyte powder in the insulating elastomer must be 55-95% and it is preferably 75-92%. When the volume fraction is less than 55%, the resulting solid electrolyte sheet has a conductivity of not more than $1 \times 10^{-6}$ s/cm and such a solid electrolyte sheet is not appropriate in practice. When the volume fraction exceeds 95%, the solid electrolyte sheet is brittle and unable to keep a sheet form.

The solid electrolyte sheet I has an ASTM A hardness of 65-96. When the hardness is less then 65, the resulting solid electrolyte sheet has a conductivity of not more than $1 \times 10^{-6}$ s/cm and such a solid electrolyte is not appropriate in practice. When the hardness exceeds 96, the solid electrolyte sheet has a poor flexibility and is brittle.

The solid electrolyte sheet I has a thickness of 10-250 $\mu$m. When the thickness is less than 10 $\mu$m, the resulting solid electrolyte sheet I is liable to tear and it is difficult to keep the required strength. When the thickness exceeds 250 $\mu$m, the solid electrolyte sheet I tends to have a conductivity of not more than $1 \times 10^{-6}$ s/cm.

In producing the solid electrolyte sheet I of this invention, a uniform dispersion of a solid electrolyte powder in an insulating elastomer is prepared by mixing 55-95% (by volume fraction) of an ion-conductive solid electrolyte powder and 5-45% (by volume fraction) of an insulating elastomer which is soluble in solvents with a solvent, and the resulting dispersion is coated on a substrate and then dried. By this method, a sheet having a hardness (ASTM A) of 65-96 and a thickness of 10-250 $\mu$m is prepared.

In the above production, the addition order of the solid electrolyte powder, the insulating elastomer and the solvent is not critical. However, in order to obtain a mixture of high uniformity, it is preferable that the solid electrolyte powder and a solution of the insulating elastomer in the solvent be kneaded under a high shearing force by means of a ball mill, a homogenizer or the like, and the resulting mixture be rolled by means of an applicator bar or the like, followed by drying the resulting solid electrolyte sheet I to remove the solvent. This production process is preferred for the following reasons: The process provides a thin film of less than 100 $\mu$m in thickness and of less thickness variation, the amount of heat generated during kneading is small, deterioration and decomposition of the solid electrolyte powder are therefore difficult to cause, the mixture has substantially no possibility of contacting with the atmosphere during kneading, it is accordingly difficult for the solid electrolyte powder to be detriorated or decomposed by the moisture or oxygen in the atmosphere, and it is easy to make the working circumstances good.

The solvent used in the above production process includes, for example, saturated hydrocarbon solvents, aromatic hydrocarbon solvents, halogenated hydrocarbon solvents and ester solvents, all of which are non-hygroscopic and do not react with the solid electrolyte powder, such as n-hexane, n-heptane, n-octane, cyclohexane, benzene, toluene, xylene, ethyl acetate, trichloroethylene and the like. It is preferable that these solvents have a boiling point of 70°-150° C. When the boiling point is less than 70° C., the evaporation rate of the solvent in the mixture is too high, and it becomes difficult in some cases to obtain a uniform sheet of a large surface area. When the boiling point is more than 150° C., the evaporation rate is low, and the productivity becomes low in some cases. The solids content of the solvent-containing mixture is preferably 50-80% by weight.

A process for producing the solid electrolyte sheet I other than the above comprises kneading the solid electrolyte powder and the insulating elastomer in, for example, a two-shaft kneading apparatus and rolling the resulting mixture into a sheet.

The solid electrolyte sheet II of this invention can be produced by filling at least the openings of a non-conductive reticulate material with the same mixture of a solid electrolyte powder and an insulating elastomer as used in the production of the solid electrolyte sheet I. This filling is specifically conducted by mixing a solvent such as a saturated hydrocarbon solvent, an aromatic hydrocarbon solvent, a halogenated hydrocarbon solvent, an ester solvent or the like (examples of this solvent are the same as used in the production of the solid electrolyte sheet I) with a solid electrolyte powder and an insulating elastomer soluble in the above solvent to prepare a solvent-containing mixture, immersing a nonconductive reticulate material in the solvent-containing mixture to allow the mixture to sufficiently adhere to the reticulate material, and then subjecting the mixture-adhering reticulate material to a blade, roll or the like each made of a hard rubber, a plastic, a metal or the like to fill all the openings of the reticulate material with the mixture and simultaneously remove the excessive solvent-containing mixture. In this case, a sheet of teflon, polyester or the like may be interposed between the blade, the roll or the like and the mixture-adhering reticulate material to remove the excessive solvent-containing mixture adhering to the reticulate material. The solids content of the solvent-containing mixture is preferably 50-80% by weight.

The non-conductive reticulate material filled, at the openings, with the solvent-containing mixture is then dried at a temperature of, for example, 20°-30° C. to obtain a solid electrolyte sheet II of this invention.

The non-conductive reticulate material may be made of, for example, celullose, nylon 6, nylon 66, polypropylene, polyethylene, polyester, glass fiber or the like. Specific examples of the non-conductive reticulate material are woven or nonwoven fabrics made of the above-mentioned substances. The proportion of openings in the reticulate material is suitably 35-65%. Herein, the proportion of openings is defined as a proportion of total opening area per unit area of reticulate material. When the proportion of openings is less than 35%, the resulting solid electrolyte sheet II has a low conductivity and, when the proportion of openings is more than 65%, the strength of the solid electrolyte sheet II becomes insufficient. The specific surface area of the reticulate material is suitably 50-1,000 $m^2/g$. When the reticulate material is an nonwoven fabric, its weight per unit area is suitably 5-50 $g/m^2$. The thickness of the reticulate material is preferably 10-150 $\mu m$ in view of the strength required for the reticulate material itself and the thiness required for the solid electrolyte sheet. Further, the average area per one opening of the reticulate material is preferably $1.6 \times 10^{-3} - 9 \times 10^{-2}$ $mm^2$ and the distance between every two adjacent openings of the reticulate -- material is preferably 20-120 $\mu m$.

In order for the cell produced therefrom to have a good adhesion and conductivity between the electrodes and the solid electrolyte sheet II, it is preferable that the reticulate material have on each side a layer of said mixture in a thickness of 5-50 $\mu m$, preferably 5-25 $\mu m$.

In the solid electrolyte sheet II of this invention, the mixture of the solid electrolyte powder and the insulating elastomer has a hardness (ASTM A) of preferably 65-96, as in the case of the solid electrolyte sheet I.

The solid electrolyte sheet II of this invention has a thickness of preferably 10-250 $\mu m$, as in the case of the solid electrolyte sheet I.

The solid electrolyte sheet II of this invention, using a non-conductive reticulate material as a matrix material, has a thickness of very high precision and moreover can be produced continuously, thus ensuring easy production of a solid electrolyte sheet of large surface area.

In order for the solid electrolyte sheets I and II to have a high adhesion strength to electrode active substances such as carbonaceous materials such as graphite, acetylene black, activated carbon and the like; metal sulfides such as niobium sulfide, molybdenum sulfide, copper sulfide, silver sulfide, lead sulfide, silver Chevrel, copper Chevrel, iron sulfide and the like; metal oxides such as tungsten oxide, vanadium oxide, chromium oxide, molybdenum oxide, titanium oxide, iron oxide, silver oxide, copper oxide and the like; metal halides such as silver chloride, lead iodide, copper iodide and the like; and metals such as copper, silver, lithium, gold, platinum, titanium, alloys of these metals, stainless steel and the like, when used in the production of a solid electrochemical element, the respective mixtures of the solid electrolyte powder and the insulating elastomer may have incorporated thereinto a rosin-based, aromatic compound based or terpene-based tackifier such as a modified rosin, a rosin derivative, a terpene resin, a coumarone-indene resin, a phenol-modified coumarone-indene resin or the like.

Each step in the process for producing the solid electrolyte sheet I or II of this invention is preferably conducted in an atmosphere having a relative humidity of 30% or less. When the relative humidity is more than 30%, the solid electrolyte powder tends to be deteriorated. The manner of controlling the relative humidity to 30% or less is not critical and it is sufficient to effect each step in a moisture-removed dry air atmosphere or in an inert gas atmosphere of nitrogen, argon or the like.

The solid electrolyte sheet of this invention is superior in ion-conductivity, processability, productivity, storage stability and flexibility, and in the production of solid electrochemical elements such as cell and the like it exhibits an excellent adhesion to electrode active substances. Therefore, this invention makes it possible to produce a thinner and larger solid electrochemical element. Accordingly, the solid electrolyte sheet of this invention can be used as an electrolyte sheet for solid microcell having a thickness of, for example, not more than 1.0 mm whose production has been difficult, and is useful as a material for other electrochemical elements such as electrochromic display element, electrical double layer capacitor and the like.

This invention is explained more specifically below referring to Examples, Comparative Examples, Test Examples and the accompanying drawings. In the accompanying drawings FIG. 1 shows a process for producing a solid electrolyte sheet II according to this invention.

Figure 1:
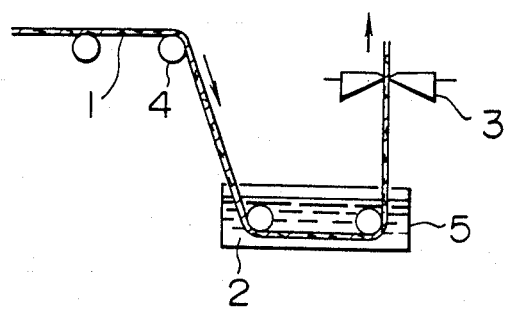
Figure 2:
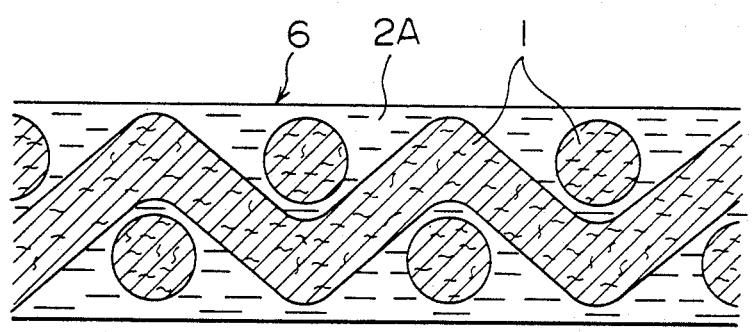
FIG. 2 is a sectional view of the solid electrolyte sheet II produced according to the process of FIG. 1.

In FIGS. 1 and 2, 1 refers to a woven fabric; 2 to a solvent-containing mixture; 3 to blades; 4 to a feed roll; 5 to a container for filling treatment; 2A to a mixture of a solid electrolyte powder and a high polymeric elastomer; and 6 to a solid electrolyte sheet.

EXAMPLES 1 TO 3 AND COMPARATIVE EXAMPLES 1 AND 2

(1) CuCl, CuI and RbCl were separately weighed so that their molar ratio became 2.5 (CuCl) : 1.5 (CuI) : 1 (RbCl). The CuCl and the CuI were recrystallized from hydrochloric acid and then vacuum-dried in a desiccator containing a desiccant ($P_2O_5$). Separately, the RbCl was vacuum-dried at 100° C. The resulting three salts were mixed in the predetermined amounts and dehydrated completely at 130° C. for 17 hours. The resulting mixture was vacuum-sealed in a Pyrex glass tube and melted. After the melt was slowly cooled to room temperature, the solid thus obtained was thoroughly ground in a ball mill using toluene as a dispersing agent. The resulting powder was pressure-molded. The molded product was treated in $N_2$ at 130° C. for about 17 hours. Then, the molded product was again ground in a ball mill to obtain a solid electrolyte powder represented by $RbCu_4I_{1.5}Cl_{3.5}$ which passed through a 200-mesh (Tyler) screen and had a specific gravity of 4.5.

(2) Subsequently, a styrene-butadiene-styrene block copolymer (TR-2000, a product of Japan Synthetic Rubber Co., Ltd.) was dissolved in toluene to prepare an insulating elastomer solution. To this solution was added the solid electrolyte powder represented by $RbCu_4I_{1.5}Cl_{3.5}$ obtained in (1) above, so that the volume fraction of the latter became 60%, 80% or 90% (Example 1, 2 or 3, respectively) and 50% or 96% (Comparative Example 1 or 2, respectively). They were kneaded in a ball mill for 2 hours to obtain five different mixtures.

(3) Each mixture obtained in (2) above was spread on a teflon sheet by means of an applicator bar and then placed in a dry air to evaporate toluene, whereby five different solid electrolyte sheets were produced.

EXAMPLES 4 TO 6

(1) A solid electrolyte powder represented by $RbCu_4I_{1.5}Cl_{3.5}$ which passed through a 200-mesh (Tyler) screen and had a specific gravity of 4.5 was prepared in the same manner as in Example 1 (1).

(2) The solid electrolyte powder represented by $RbCu_4I_{1.5}Cl_{3.5}$ obtained in (1) above was mixed with pellets of a styrene-butadiene-styrene block copolymer (TR-2000, a product of Japan Synthetic Rubber Co., Ltd.) so that the volume fraction of the former became 60%, 80% or 90% (Example 4, 5 or 6, respectively). They were kneaded at 110° C. for 30 minutes in a twin-screw kneading machine to obtain three different mixtures.

(3) Each mixture obtained in (2) above was rolled by a twin roll to produce three different solid electrolyte sheets.

EXAMPLES 7 TO 9 AND COMPARATIVE EXAMPLES 3 TO 4

(1) A solid electrolyte powder represented by $RbCu_4I_{1.5}Cl_{3.5}$ which passed through a 200-mesh (Tyler) screen and had a specific gravity of 4.5 was prepared in the same manner as in Example 1 (1).

(2) Subsequently, a styrene-butadiene-styrene block copolymer (TR-2000, a product of Japan Synthetic Rubber Co., Ltd.) was dissolved in toluene to prepare an insulating elastomer solution. To this solution was added the solid electrolyte powder represented by $RbCu_4I_{1.5}Cl_{3.5}$ obtained in (1) above so that the vouume fraction of the latter became 60%, 80% or 90% (Example 7, 8 or 9, respectively) or 50% or 96% (Comparative Examples 3 or 4, respectively). They were kneaded in a ball mill for 2 hours to obtain five different mixtures.

(3) Each mixture obtained in (2) above was placed in a polyethylene container 5 as shown in FIG. 1 and its solids content was adjusted to 58% by weight, 69% by weight or 79% by weight (Example 7, 8 or 9, respectively) and 55% by weight or 83% by weight (Comparative Example 3 or 4, respectively). A dried sheet was prepared from each of the resulting mixtures. (These sheets were used for hardness measurement.) Separately, a woven fabric 1 (a woven fabric of nylon 66 having a thickness of 50 μm, an average area per one opening of $5.5 \times 10^3$ mm² and a distance between two adjacent openings of 50 μm) was immersed in the above mixture in the container 5 to allow the mixture to sufficiently adhere to the surface of the woven fabric 1. The mixture-adhering woven fabric was then pinched between fluororubber blades 3 and pulled out through between the blades while applying an appropriate pressure to the blades, whereby the openings of the woven fabric were sufficiently filled with the mixture. The resulting sheet was thoroughly dried in a nitrogen stream to remove the solvent in the mixture, whereby five different solid electrolyte sheets were produced. FIG. 2 shows a sectional view of these solid electrolyte sheets.

EXAMPLES 10 TO 12 AND COMPARATIVE EXAMPLES 5 AND 6

(1) A solid electrolyte powder represented by $RbCu_4I_{1.5}Cl_{3.5}$ which passed through a 200-mesh (Tyler) screen and had a specific gravity of 4.5 was prepared in the same manner as in Example 1 (1).

(2) Subsequently, a styrene-ethylene-butylene-styrene block copolymer [Kraton G-1650 (a trade name of Shell) having a specific gravity of 0.92], and a styrene-butadiene-styrene block copolymer (TR-2000 having a specific gravity of 0.96, a product of Japan Synthetic Rubber Co., Ltd.) were separately weighed so that their volume ratio became 8:2. They were dissolved in toluene to prepare an insulating elastomer solution. To this solution was added the solid electrolyte powder represented by $RbCu_4I_{1.5}Cl_{3.5}$ obtained in (1) above so that the volume fraction of the latter became 60%, 80% or 90% (Example 10, 11 or 12, respectively) or 50% or 96% (Comparative Example 5 or 6, respectively). They were kneaded in a ball mill for 2 hours to obtain five different mixtures.

(3) Each mixture obtained in (2) above was placed in a polyethylene container 5 as shown in FIG. 1 and its solids content was adjusted to 58% by weight, 69% by weight or 79% by weight (Example 10, 11 or 12, respectively) or 55% by weight or 83% by weight (Comparative Example 3 or 4, respectively). A dried sheet was prepared from each of the resulting mixtures. (These sheets were used for hardness measurement.) Separately, a woven fabric 1 (a woven fabric of nylon 66 having a thickness of 50 μm, an average area per one opening of $5.5 \times 10^{-3}$ mm² and a distance between two adjacent openings of 50 μm) was immersed in the above mixture in the container 5 to allow the mixture to sufficiently adhere to the surface of the woven fabric 1. The mixture-adhering woven fabric was then pinched between fluororubber blades 3 and pulled out through between the blades while applying an appropriate pressure to the blades, whereby the openings of the woven fabric were sufficiently filled with the mixture. The resulting sheet was thoroughly dried in a nitrogen stream to remove the solvent in the mixture, whereby five different solid electrolyte sheets were produced.

TEST EXAMPLE 1

Each of the solid electrolyte sheets obtained in Examples 1 to 12 and Comparative Examples 1 to 6 was subjected to measurements of hardness, flex resistance, total conductivity, electron transport number and adhesion to copper plate according to the following methods. The results are shown in Table 1.

Hardness

In Examples 1 to 6 and Comparative Examples 1 and 2, the respective solid electrolyte sheets obtained were folded to a thickness of about 1 mm and then measured for ASTM A hardness on a glass plate.

In Examples 7 to 12 and Comparative Examples 3 to 6, the respective sheets obtained only from a mixture of a solid electrolyte powder and an insulating elastomer and containing no woven fabric were folded to a thickness of about 1 mm and then measured for ASTM A hardness on a glass plate.

Bending resistance

A bending test was conducted in which a solid electrolyte sheet was bent along the periphery of a pipe of 80 mm in radius. The flex resistance of the sheet was taken as the number of repetitions of bending at which crack or breakage appeared first.

Adhesion to copper plate

A solid electrolyte sheet was placed on a polished copper plate. A teflon sheet was placed thereon. They were pressed at a pressure of 10 kg/cm$^2$ at 130° C. for 5 minutes. Then, the solid electrolyte sheet adhering to the copper plate was subjected to a cross-cut test (commercially available cellophane adhesive tape was used, the size of each square formed by cross-cutting was 5 mm ×5 mm and the number of squares was 100). The adhesion to copper plate of the solid electrolyte sheet was evaluated by the number of the peeled squares.

Total conductivity

Figure 3:
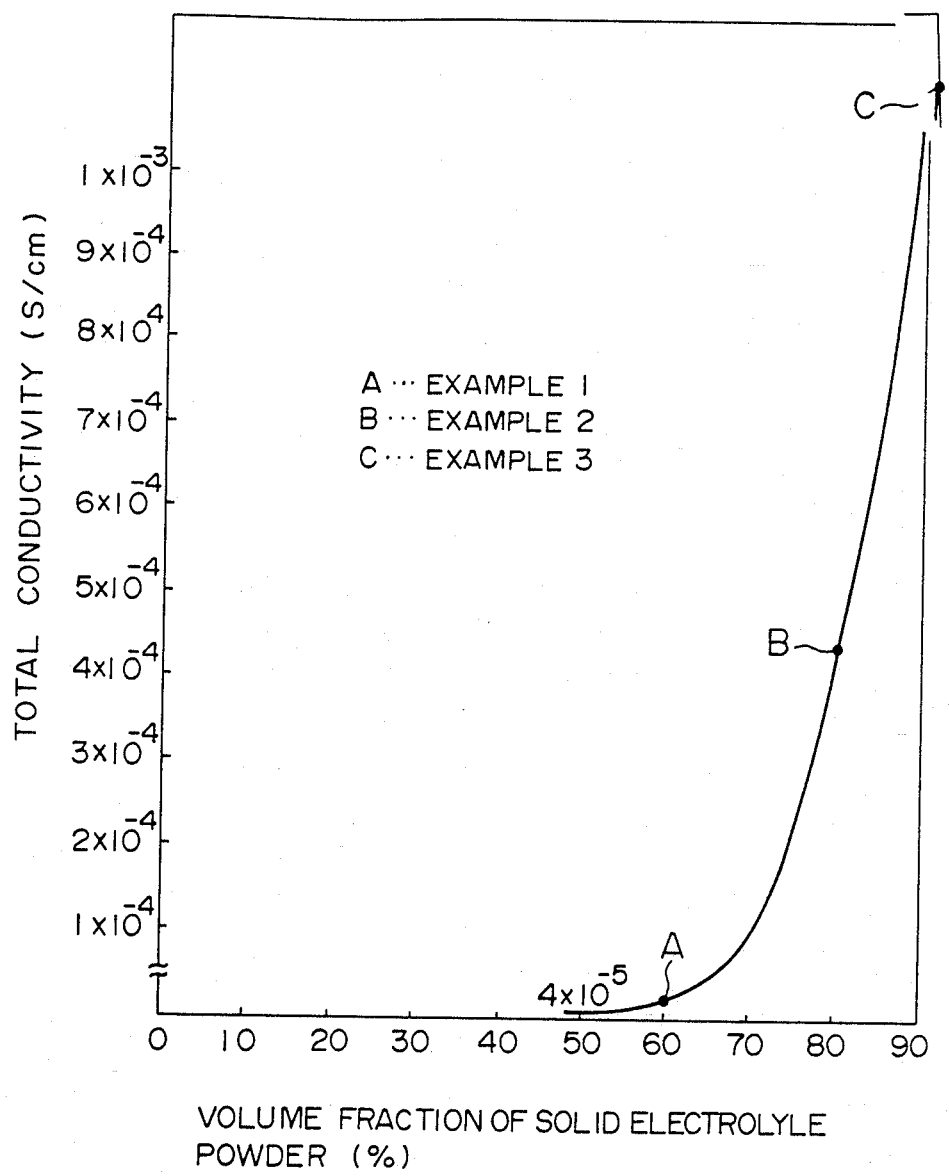
FIG. 3 is a graph showing relationships between the volume fractions of the solid electrolyte powders of Examples 1 to 3 and their total conductivities.

A solid electrolyte sheet was sandwitched in between two copper plates and then a pressure of 10 kg/cm$^2$ was applied thereto at 130° C., for 5 minutes to bond the sheet to the copper plates. The resulting laminate was measured for impedance at an AC of 1 KHz using a LCR meter (YHP 4274A). The total conductivity of the solid electrolyte sheet was determined from the DC component (6A) of the impedance. The relationships between volume fraction of solid electrolyte powder and total conductivity of the solid electrolyte sheets of Examples 1 to 3 are shown in FIG. 3.

Electron transport number

A solid electrolyte sheet was sandwitched in between two copper plates and then a pressure of 10 kg/cm$^2$ was applied thereto at 130° C. for 5 minutes to bond the sheet to the copper plates. A DC voltage was applied to the thus obtained laminate while slowly increasing the voltage from 0 to 0.5 V, and the amount of electricity which had flown through the laminate was measured. Then, a DC conductivity (6D) was determined from the electricity amount, and the electron transport number of the solid electrolyte sheet was determined as a ratio between the DC conductivity (6D) and the above DC component (6A), i.e., 6D/6A.

Test Example 2

Each of the solid electrolyte sheets obtained in Examples 10 to 12 was sandwitched in between a platinum plate as a positive electrode and a copper plate as negative electrode. The resulting assembly was pressed at a pressure of 10 kg/cm$^2$ at 130° C. for 5 minutes. A DC voltage was applied to each of the resulting assembly while slowly increasing the voltage, whereby equilibrium current values at various voltages were determined and a curve between voltage and equilibrium current value was prepared. Using this curve, the voltage at which the equilibrium current value showed a rapid increase was taken as the decomposition voltage of the solid electrolyte sheet tested.

As a result, the solid electrolyte sheet of Example 10 showed a decomposition voltage of 0.61 V; the solid electrolyte sheet of Example 11 showed a decomposition voltage of 0.60 V; and the solid electrolyte sheet of Example 12 showed a decomposition voltage of 0.60 V. Thus, with all of these solid electrolyte sheets, a good decomposition voltage was obtained.

TABLE 1

|  | Example 1 | Example 2 | Example 3 | Comparative Example 1 | Comparative Example 2 | Example 4 |
|---|---|---|---|---|---|---|
| Volume fraction of solid electrolyte powder (%) | 60 | 80 | 90 | 50 | 96 | 60 |
| Hardness | 67 | 85 | 92 | 60 | *1 | 68 |
| Thickness of sheet (μm) | 42 | 58 | 72 | 40 |  | 120 |
| Bending resistance (number of repetitions) | 2 × 10$^5$ | 1.8 × 10$^4$ | 6.8 × 10$^3$ | — |  | 1.7 × 10$^5$ |
| Adhesion to copper plate *2 | 100/100 | 100/100 | 100/100 | 100/100 |  | 100/100 |
| Total conductivity (s/cm) | 4 × 10$^{-5}$ | 4.3 × 10$^{-4}$ | 1.1 × 10$^{-3}$ | 8 × 10$^{-7}$ |  | 3.5 × 10$^5$ |
| Electron transport number (%) | 0.03 | 0.03 | 0.04 | 0.03 |  | 0.6 |

|  | Example 5 | Example 6 | Example 7 | Example 8 | Example 9 | Comparative Example 3 |
|---|---|---|---|---|---|---|
| Volume fraction of solid electrolyte powder (%) | 80 | 90 | 60 | 80 | 90 | 50 |
| Hardness | 86 | 93 | 66 | 83 | 91 | 59 |
| Thickness of sheet (μm) | 170 | 210 | 62 | 68 | 72 | 60 |
| Bending resistance (number of repetitions) | 1.1 × 10$^4$ | 5 × 10$^3$ | 5 × 10$^5$ | 5 × 10$^5$ | 5 × 10$^5$ | 5 × 10$^5$ |
| Adhesion to copper plate *2 | 100/100 | 100/100 | 100/100 | 100/100 | 100/100 | 100/100 |
| Total conductivity (s/cm) | 3.8 × 10$^{-4}$ | 9.2 × 10$^{-4}$ | 3.9 × 10$^{-5}$ | 4.2 × 10$^{-4}$ | 1.0 × 10$^{-3}$ | 8 × 10$^{-7}$ |
| Electron transport number (%) | 0.7 | 0.9 | 0.02 | 0.02 | 0.03 | 0.02 |

|  | Comparative Example 4 | Example 10 | Example 11 | Example 12 | Comparative Example 5 | Comparative Example 6 |
|---|---|---|---|---|---|---|
| Volume fraction of solid electrolyte powder (%) | 96 | 60 | 80 | 90 | 50 | 96 |

TABLE 1-continued

| | | | | | | |
|---|---|---|---|---|---|---|
| Hardness | *1 | 68 | 85 | 93 | 61 | *1 |
| Thickness of sheet ($\mu$m) | | 75 | 88 | 100 | 70 | |
| Bending resistance · (number of repetitions) | | More than $5 \times 10^5$ | More than $5 \times 10^5$ | More than $5 \times 10^5$ | More than $5 \times 10^5$ | |
| Adhesion to copper plate *2 | | 100/100 | 100/100 | 100/100 | 100/100 | |
| Total conductivity (s/cm) | | $5.8 \times 10^{-5}$ | $1.0 \times 10^{-3}$ | $5.2 \times 10^{-3}$ | $9 \times 10^{-7}$ | |
| Electron transport number (%) | | 0.001 | 0.001 | 0.002 | 0.001 | |

Note:
*1 Unable to measure because the mixture of a solid electrolyte and a high polymeric elastomer turned into small pieces at the time of its processing into a sheet or of its coating on a woven fabric.
*2 Expressed as (number of remaining squares)/100 (number of total squares)

What is claimed is:

1. A solid electrolyte sheet comprising an ion-conductive inorganic solid electrolyte powder and an insulating elastomer, wherein the inorganic solid electrolyte powder is uniformly dispersed in the insulating elastomer in a volume fraction of 55-95%, said sheet having a hardness (ASTM A) of 65-96 and a thickness of 10-250 $\mu$m.

2. The solid electrolyte sheet according to claim 1, wherein the inorganic solid electrolyte is RbCu$_4$I$_{2-x}$Cl$_{3+x}$ (x is any number between 0.2 and 0.6).

3. The solid electrolyte sheet according to claim 1, wherein the insulating elastomer contains at least 50% by volume of an elastomer having no unsaturation.

4. The solid electrolyte sheet according to claim 1, wherein the insulating elastomer is at least one elastomer selected from the group consisting of 1,4-polybutadiene, natural rubber, polyisoprene, styrene-butadiene rubber, acrylonitrile-butadiene rubber, ethylene-propylene-diene terpolymer, ethylene-propylene copolymer, urethane rubber, polyester rubber, chloroprene rubber, epichlorohydrin rubber, silicone rubber, styrene-butadiene-styrene block copolymer, styrene-isoprene-styrene block copolymer, styrene-ethylene-butylene-styrene copolymer, styrene-ethylene-propylene block copolymer, butyl rubber, phosphazene rubber, polyethylene, polypropylene, poly(ethylene oxide), poly(propylene oxide), polystyrene, poly(vinyl chloride), ethylene-vinyl acetate copolymer, 1,2-polybutadiene, epoxy resin, phenol resin, cyclized polybutadiene, cyclized polyisoprene and poly(methyl methacrylate).

5. The solid electrolyte sheet according to claim 3, wherein the elastomer having no unsaturation is at least one elastomer selected from the group consisting of styrene-ethylene-butylene-styrene copolymer, styrene-ethylene-propylene block copolymer, polyethylene, polypropylene, poly(ethylene oxide), polystyrene, poly(vinyl chloride) and ethylene-vinyl acetate copolymer.

6. A solid electrolyte sheet comprising a non-conductive reticulate material and a mixture of an ion-conductive inorganic solid electrolyte powder and an insulating elastomer, in which mixture the inorganic solid electrolyte powder is uniformly dispersed in the insulating elastomer in a volume fraction of 55-95%, at least the openings of the reticulate material being filled with the mixture.

7. The solid electrolyte sheet according to claim 6, wherein the insulating solid electrolyte is RbCu$_4$I$_{2-x}$Cl$_{3+x}$ (x is any number between 0.2 and 0.6).

8. The solid electrolyte sheet according to claim 6, wherein the insulating elastomer contains at least 50% by volume of an elastomer having no unsaturation.

9. The solid electrolyte sheet according to claim 6, which has a hardness (ASTM A) of 65-96.

10. The solid electrolyte sheet according to claim 6, wherein the non-conductive reticulate material is a woven or nonwoven fabric of cellulose, nylon 6, nylon 66, polypropylene, polyethylene, polyester or glass fiber.

11. The solid electrolyte sheet according to claim 6, wherein the non-conductive reticulate material is a woven fabric having a proportion of openings of 35-65% or a nonwoven fabric having a weight per unit area of 5-50 g/m$^2$.

12. The solid electrolyte sheet according to claim 6, wherein the non-conductive reticulate material has on each side a layer of the mixture having a thickness of 5-50 $\mu$m.

* * * * *